(12) United States Patent
Leibowitz et al.

(10) Patent No.: US 8,412,880 B2
(45) Date of Patent: Apr. 2, 2013

(54) MEMORY SYSTEM CONTROLLER TO MANAGE WEAR LEVELING ACROSS A PLURALITY OF STORAGE NODES

(75) Inventors: Robert N. Leibowitz, Boise, ID (US); Peter Feeley, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 631 days.

(21) Appl. No.: 12/350,686

(22) Filed: Jan. 8, 2009

(65) Prior Publication Data
US 2010/0174851 A1 Jul. 8, 2010

(51) Int. Cl.
*G06F 12/00* (2006.01)

(52) U.S. Cl. ........ 711/103; 711/154; 711/114; 711/203; 711/E12.008

(58) Field of Classification Search .................. 711/154, 711/103, E12.001, E12.008, 114, 203, 170; 710/22
See application file for complete search history.

(56) References Cited

U.S. PATENT DOCUMENTS

| | | | |
|---|---|---|---|
| 5,235,685 A | 8/1993 | Caldara et al. | |
| 5,278,961 A | 1/1994 | Mueller | |
| 5,787,445 A | 7/1998 | Daberko | |
| 6,725,321 B1 | 4/2004 | Sinclair et al. | |
| 6,757,806 B2 | 6/2004 | Shim | |
| 7,409,492 B2* | 8/2008 | Tanaka et al. ................ | 711/103 |
| 7,596,675 B2* | 9/2009 | Jobs et al. ..................... | 711/170 |
| 7,669,019 B2* | 2/2010 | Fujibayashi et al. .......... | 711/103 |
| 8,024,508 B2* | 9/2011 | Son et al. ...................... | 711/103 |
| 2004/0133565 A1 | 7/2004 | Hinshaw et al. | |
| 2004/0250011 A1* | 12/2004 | Chen et al. .................... | 711/103 |
| 2005/0144366 A1* | 6/2005 | Fuse et al. ..................... | 711/103 |
| 2006/0087885 A1 | 4/2006 | Murakami et al. | |
| 2007/0226403 A1 | 9/2007 | Son et al. | |
| 2007/0233939 A1* | 10/2007 | Kim ............................... | 711/103 |
| 2007/0288702 A1 | 12/2007 | Roohparvar | |
| 2008/0086588 A1 | 4/2008 | Danilak et al. | |
| 2008/0091876 A1 | 4/2008 | Fujibayashi et al. | |
| 2008/0147968 A1 | 6/2008 | Lee et al. | |
| 2008/0209112 A1 | 8/2008 | Yu et al. | |
| 2008/0215847 A1* | 9/2008 | Holtzman et al. ............. | 711/173 |
| 2008/0282264 A1 | 11/2008 | Chen et al. | |
| 2008/0320214 A1* | 12/2008 | Ma et al. ....................... | 711/103 |
| 2009/0204872 A1* | 8/2009 | Yu et al. ........................ | 714/773 |
| 2009/0240873 A1* | 9/2009 | Yu et al. ........................ | 711/103 |

(Continued)

FOREIGN PATENT DOCUMENTS

WO 2005/089126 A2 9/2005

OTHER PUBLICATIONS

Wear-Leveling Techniques in NAND Flash Devices, 2008, Micron, TN-29-42, pp. 1-8.*

(Continued)

*Primary Examiner* — Pierre-Michel Bataille
(74) *Attorney, Agent, or Firm* — Brooks, Cameron & Huebsch PLLC

(57) ABSTRACT

The present disclosure includes methods and devices for a memory system controller. In one or more embodiments, a memory system controller includes a host interface communicatively coupled to a system controller. The system controller has a number of memory interfaces, and is configured for controlling a plurality of intelligent storage nodes communicatively coupled to the number of memory interfaces. The system controller includes logic configured to map between physical and logical memory addresses, and logic configured to manage wear level across the plurality of intelligent storage nodes.

40 Claims, 7 Drawing Sheets

U.S. PATENT DOCUMENTS

2010/0017556 A1* 1/2010 Chin et al. .................... 711/103
2010/0017650 A1* 1/2010 Chin et al. ........................ 714/6
2010/0088461 A1* 4/2010 Yang et al. .................... 711/103

OTHER PUBLICATIONS

International Search Report and Written Opinion for PCT Application PCT/US2009/006740, mailed Jul. 28, 2010 (9 pgs.).

Open NAND Flash Interface Organization, "ONFI: Leading the Adoption of NAND Flash Webpage," www.onfi.org/, 1 page, accessed Jan. 7, 2008.

Korean Notice of Rejection for related KR Application No. 10-2011-7015980( 6 pgs.) and KIPO's Notice of Preliminary Rejection (English Translation), mailed Oct. 18, 2012, (6 pgs.).

European Search Report and Opinion for related PCT Application No. PCT/US2009/006740, mailed Nov. 9, 2012, (5 pgs.).

* cited by examiner

MEMORY SYSTEM CONTROLLER TO MANAGE WEAR LEVELING ACROSS A PLURALITY OF STORAGE NODES

TECHNICAL FIELD

The present disclosure relates generally to semiconductor memory devices, methods, and systems, and more particularly, to a memory system controller.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored information when not powered and can include NAND flash memory, NOR flash memory, read only memory (ROM), Electrically Erasable Programmable ROM (EEPROM), Erasable Programmable ROM (EPROM), and phase change random access memory (PCRAM), among others.

Memory devices can be combined together to form a solid state drive (SSD). A solid state drive can include non-volatile memory, e.g., NAND flash memory and NOR flash memory, and/or can include volatile memory, e.g., DRAM and SRAM, among various other types of non-volatile and volatile memory.

An SSD can be used to replace hard disk drives as the main storage device for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may ameliorate seek time, latency, and other electro-mechanical delays associated with magnetic disk drives. SSD manufacturers can use non-volatile flash memory to create flash SSDs that may not use an internal battery supply, thus allowing the drive to be more versatile and compact.

An SSD can include a number of memory devices, e.g., a number of memory chips (as used herein, "a number of" something can refer to one or more such things; for example, a number of memory devices can refer to one or more memory devices). As one of ordinary skill in the art will appreciate, a memory chip can include a number of dies. Each die can include a number of memory arrays and peripheral circuitry thereon. A memory array can include a number of planes, with each plane including a number of physical blocks of memory cells. Each physical block can include a number of pages of memory cells that can store a number of sectors of data.

In order to achieve low latency and high bandwidth operations across large storage capacity, SSDs may include multiple channels operating in parallel, with each channel operating some portion of memory. Thus, multiple copies of a memory channel controller, e.g., NAND flash controller logic, may be integrated on an SSD's multi-channel system controller. In such an arrangement, each channel is tasked with operating the associated memory served by the channel, including performing physical to logical mapping and block management, e.g., wear leveling. Therefore, each copy of the multiple memory channel controllers, corresponding to each of the multiple channels, may have high speed buffer memory used to carry out the mapping and block management functions. In addition, each copy of the multiple memory channel controllers may include buffer memory for "in-flight" data directed to a respective channel.

Parallel communications between each copy of the multiple memory channel controllers and the corresponding portions of memory may require approximately 20 pins to establish data, control, power, and ground connections therebetween. This can result in an expensive memory system ASIC having a large pin count to ensure compatibility with existing disk drive protocols.

DETAILED DESCRIPTION

Figure 1:
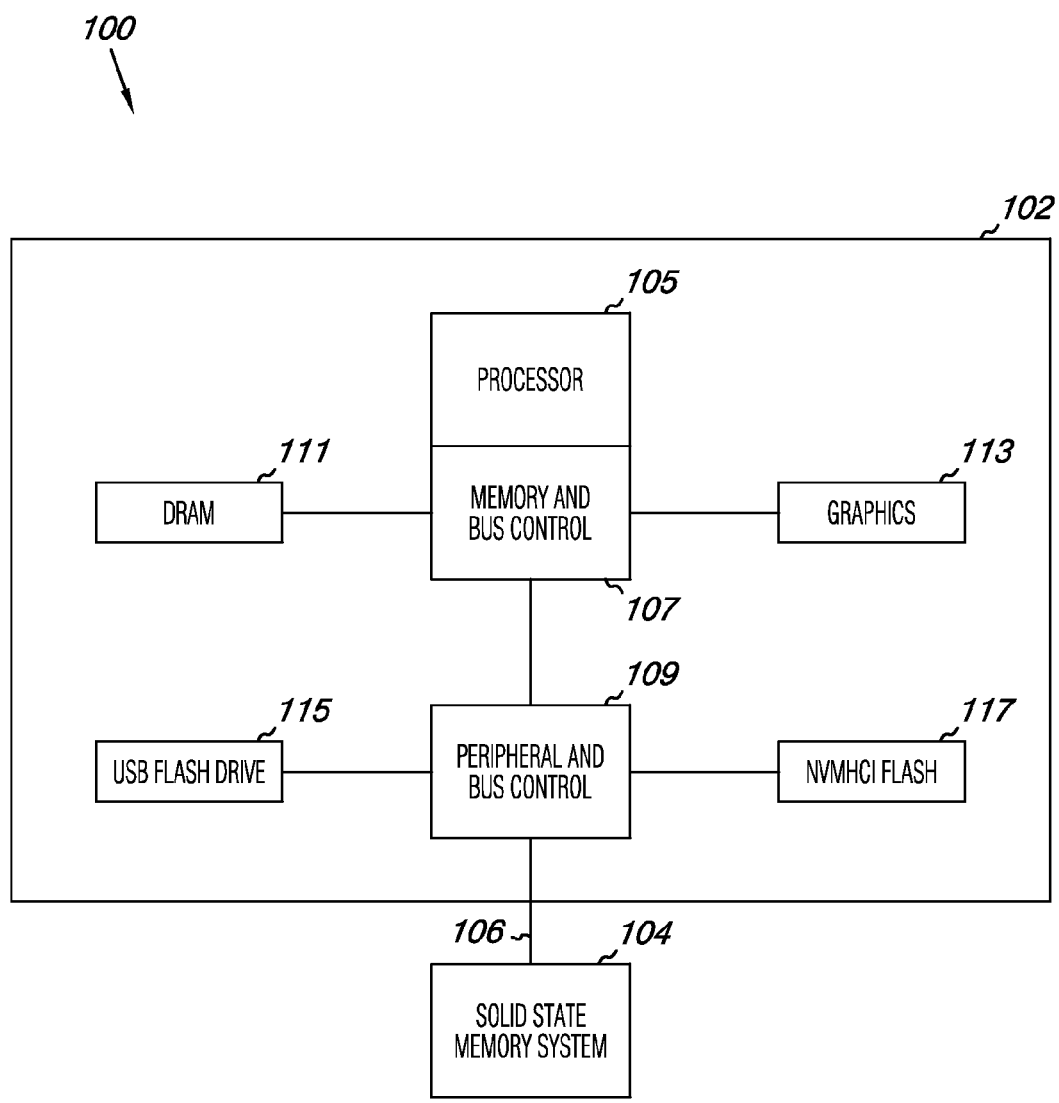
FIG. 1 is a functional block diagram of a computing system, in accordance with one or more embodiments of the present disclosure.

The present disclosure includes memory system controller devices and methods. In one or more embodiments, a memory system controller includes a host interface communicatively coupled to a system controller. The system controller has a number of memory interfaces, and is configured for controlling a plurality of intelligent storage nodes communicatively coupled to the number of memory interfaces. The system controller includes logic configured to map between physical and logical memory addresses, and logic configured to manage wear level across the plurality of intelligent storage nodes.

One or more embodiments of the present disclosure describe a memory system that centralizes traditionally distributed solid state drive functionality, such as NAND control, physical to logical address translation, defect management and block management, e.g., wear leveling, "upstream" to a central memory system controller. By centrally locating the above-mentioned functionality, simplified node controllers may be utilized on storage nodes thereby providing low latency, high memory density, configurability, and lower memory system cost.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2, etc.

FIG. 1 is a functional block diagram of a computing system in accordance with one or more embodiments of the present disclosure. Computing system 100 includes a memory system 104, for example one or more solid state drives (SSDs), communicatively coupled to host system 102. Memory system 104 can be communicatively coupled to the host system 102 through a communication interface 106, e.g., a Serial Advanced Technology Attachment (SATA) interface.

The host system 102 can include a number of separate integrated circuits, or more than one component or function can be on the same integrated circuit. According to one or more embodiments, the host system 102 can be physically implemented in a computing system 100, at least in part, as a "motherboard," with the memory system 104 being physically implemented separately, the motherboard and memory system 104 being communicatively coupled through a communication interface 106, such as by a backplane or bus.

Host system 102 can include one or more processors 105, e.g., parallel processors, co-processors, etc., communicatively coupled to a memory and bus control 107. A processor, e.g., processor 105, can be one or more microprocessors, or some other type of controlling circuitry such as one or more application-specific integrated circuits (ASICs), for example. Other components of the computing system may also have processors. The memory and bus control 107 can have memory and other components directly communicatively coupled thereto, for example, dynamic random access memory (DRAM) 111, graphic user interface 113, or other user interface, e.g., display monitor, keyboard, mouse, etc.

The memory and bus control 107 can also have a peripheral and bus control 109 communicatively coupled thereto, which in turn, can connect to a number of devices, such as a flash drive 115 using a universal serial bus (USB) interface, a non-volatile memory host control interface (NVMHCI) flash memory 117, or the memory system 104. As the reader will appreciate, the memory system 104 can be used in addition to, or in lieu of, a hard disk drive (HDD) in a number of different computing systems. The computing system 100 illustrated in FIG. 1 is one example of such a system; however, embodiments of the present disclosure are not limited to the configuration shown in FIG. 1.

Enterprise solid state storage appliances are a class of memory systems that can be characterized by one or more terabytes of storage and fast performance capabilities, for example 100 MB/sec, 100K inputs/outputs per second (IOPS), etc. According to one or more embodiments of the present disclosure, an enterprise solid state storage appliance can be configured using solid state drive (SSD) building blocks. For example with respect to FIG. 1, the memory system 104 may be an enterprise solid state storage appliance implemented using one or more component SSDs, the one or more SSDs being operated as a memory system by a memory system controller.

Figure 2:
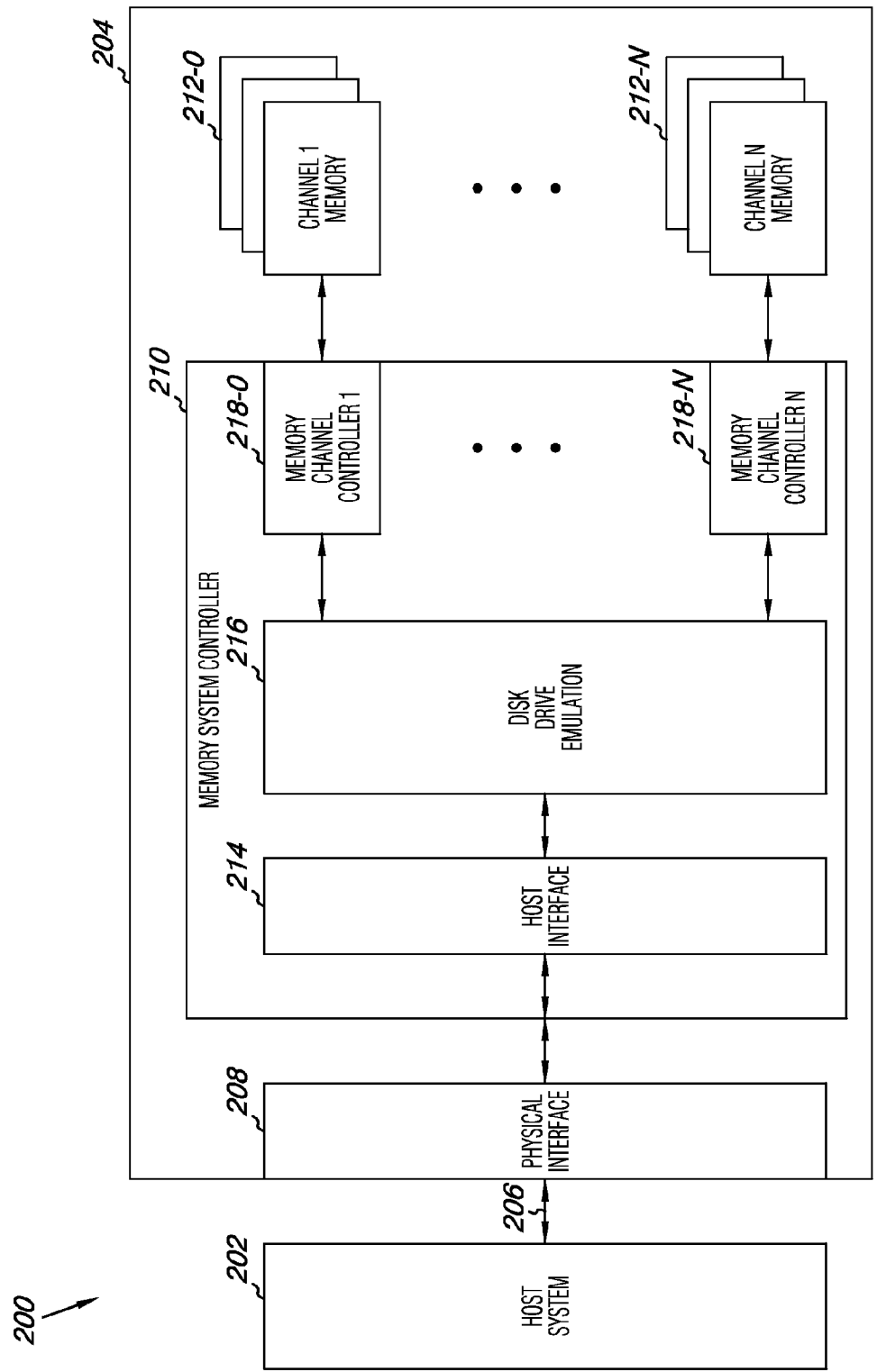
FIG. 2 is a functional block diagram of a prior art computing system including a memory system.

FIG. 2 is a functional block diagram of a prior art computing system including a memory system. Computing system 200 includes a memory system 204, e.g., an SSD, connected to host system 202 through an interface 206. The prior art memory system 204 includes a system controller 210, a physical interface 208, e.g., a connector, and a number of memory devices 212-1, . . . , 212-N, corresponding to respective channels of the system controller 210. The interface 206 is used to communicate information between the memory system 204 and the host system 202.

System controller 210 may include control circuitry for controlling access across a number of channels, each channel having a memory controller, e.g., 218-1, . . . , 218-N, corresponding to the number of memory devices 212-1, . . . , 212-N. Each memory channel controller, e.g., 218-1, . . . , 218-N, manages access to the corresponding memory devices 212-1, . . . , 212-N, including providing mapping between physical and logical address associated with a particular channel. Additionally, each memory channel controller, e.g., 218-1, . . . , 218-N, manages wear leveling for the memory devices associated with the particular channel.

The memory system 204 integrates all the logic to interface to a host system and to control the number of memory devices 212-1, . . . , 212-N in a way that emulates a disk drive. Thus, system controller 210 includes a host interface 214 in communication with disk drive emulation logic 216, which in turn is in communication with the number of memory controllers 218-1, . . . , 218-N.

Figure 3:
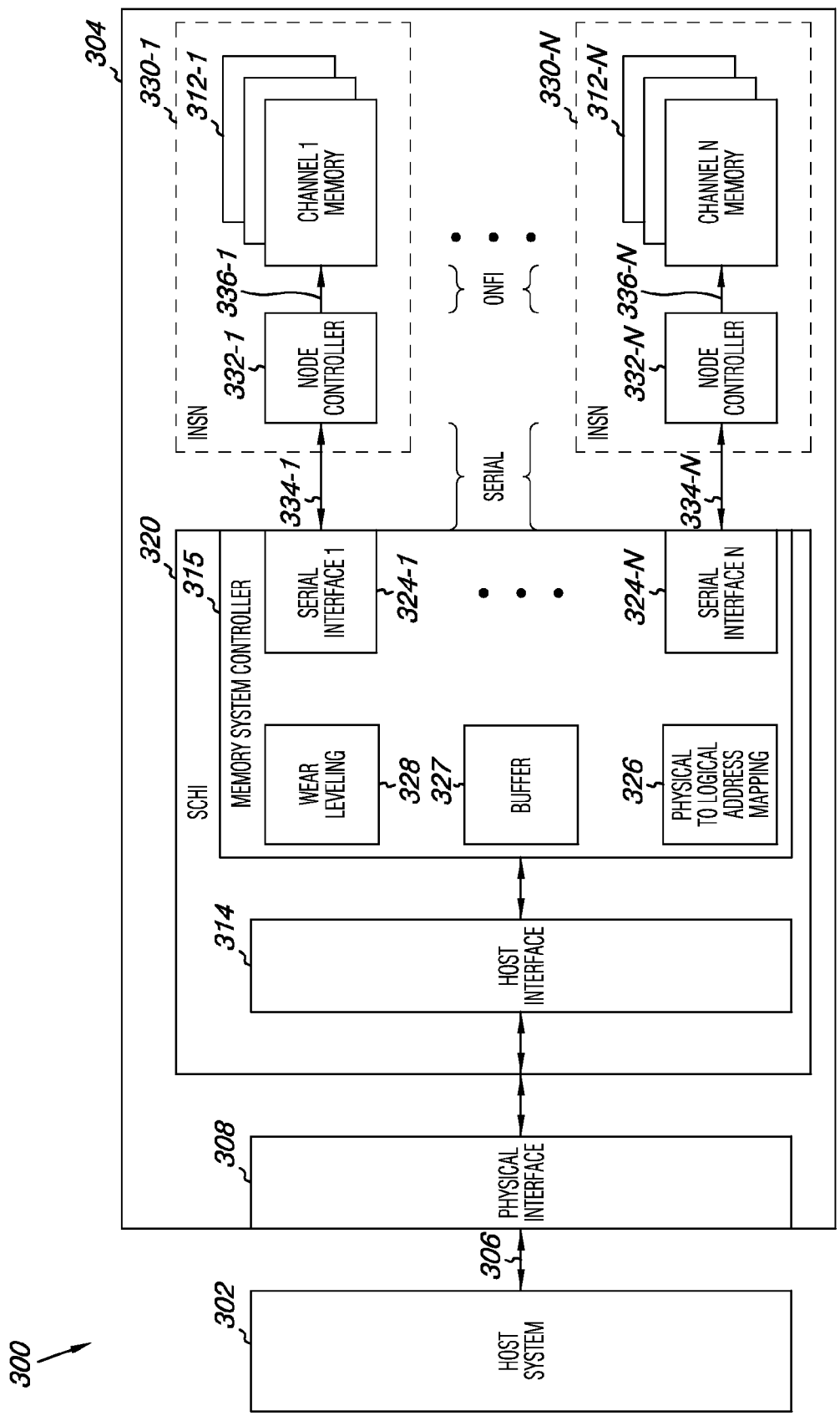
FIG. 3 is a functional block diagram of a computing system including a memory system controller, in accordance with one or more embodiments of the present disclosure.

FIG. 3 is a functional block diagram of a computing system including a memory system controller, in accordance with one or more embodiments of the present disclosure. Computing system 300 can include a memory system 304 communicatively coupled to host system 302 through an interface 306. The memory system 304 can be used as a mass data storage memory system in computing system 300, e.g., an enterprise solid state storage appliance having one or more SSDs. The memory system 304 can be used as an external, or portable, memory system for computing system 300, e.g., with plug-in connectivity. Interface 306 can be a cable or bus, such as a USB, PCI, SATA/150, SATA/300, or SATA/600 interface, among others. The memory system 304 can be analogous to the memory system 104 in FIG. 1.

The memory system 304 can include a system controller and host interface 320 (SCHI) in communication between a physical interface 308, e.g., a connector, and a number of storage nodes 330-1, . . . , 330-N. The memory system controller 315 can communicate with the number of storage nodes 330-1, . . . , 330-N, each storage node having a number of memory devices 312-1, . . . , 312-N, to operate, e.g., read, write, move, program, sense, erase, the memory cells of the memory devices. Thus, memory system controller 315 can manage communications with, and the data stored in, the memory devices 312-1, . . . , 312-N. The memory system controller 315 can have circuitry utilizing one or more integrated circuits, as well as other discrete components. For one or more embodiments, the circuitry in the memory system controller 315 can include control circuitry for controlling access across a number of channels, each channel having a serial interface, e.g., 324-1, . . . , 324-N, each serial interface communicating with one or more storage nodes 330-1, . . . , 330-N, and each storage node having a number of memory devices 312-1, . . . , 312-N. Thus, the memory system controller 315 can selectively communicate through one or more particular channels to the memory devices 312-1, . . . , 312-N.

Each memory device 312-1, . . . , 312-N can include a number of memory cells. The memory devices 312-1, . . . , 312-N can be formed using various types of volatile or non-volatile memory arrays, e.g., NAND flash, DRAM, among others. According to one or more embodiments of the present disclosure, the memory devices 312-1, . . . , 312-N can include a number of floating gate flash memory cells arranged in a NAND architecture, a NOR architecture, an AND architecture, or some other memory array architecture, one or more of which may be used in combination.

Memory devices 312-1, . . . , 312-N can include a number of memory cells that can be arranged to provide particular physical or logical configurations, such as a page, block, plane, array, or other group. As used herein, a page of memory cells means a number of memory cells programmable at one time. For example, some memory arrays can include a number of pages of memory cells that make up a block of memory cells, a block referring to a number of memory cells erasable at one time. A number of blocks can be included in a plane of memory cells. A number of planes of memory cells can be included on a die. An array can include one or more die. By way of example, and not of limitation, a 128 GB memory device can include 4314 bytes of data per page, 128 pages per block, 2048 blocks per plane, and 16 planes per device.

The SCHI 320 can include a host interface 314 in communication with a system controller 315. System controller 315 can include logic 326 (including high speed memory) configured for performing physical to logical mapping, logic 327 configured for "in-flight" data buffering, logic 328 configured for block management, e.g., wear leveling, and a number of serial interfaces 324-1, . . . , 324-N. Each of the number of serial interfaces 324-1, . . . , 324-N are communicatively coupled to a corresponding one or more of the number of storage nodes 330-1, . . . , 330-N by a serial bus 334-1, . . . , 334-N as will be described further below with respect to FIG. 4.

The communication protocol between the host system 302 and the memory system 304 may be different than what is used for accessing a particular storage node 330-1, . . . , 330-N, or the memory devices thereon, e.g., 312-1, . . . , 312-N. Memory system controller 315 can translate commands received from the host system 302 into appropriate commands to accomplish the intended memory operation, and thereby provide a translation layer between the host system 302 and the memory system 304. Memory system controller 315 can also process host command sequences and associated data, and other information, to the appropriate channel command sequences in order to store and retrieve data, for example.

In one or more embodiments, and as illustrated in FIG. 3, a storage node 330-1, . . . , 330-N can include one or more memory devices 312-1, . . . , 312-N and a node controller 332-1, . . . , 332-N. In one or more embodiments, the memory devices 312-1, . . . , 312-N can each be a chip having a number of memory cells. However, embodiments are not so limited. For example, as used herein, a memory device can be a die, array, or other group of memory cells that share control inputs, and may be fabricated using one or more memory cell types, e.g., NAND flash. Control inputs can generally include address latch enable (ALE), chip enable (CE), read enable (RE), ready/busy (RIB), write protect (WP), and input/output (I/O) connections such as pins, pads, or the like.

According to one or more embodiments of the present disclosure, the storage nodes 330-1, . . . , 330-N can be intelligent NAND storage nodes (INSNs). Although a single INSN is shown associated with a particular channel, embodiments of the present disclosure are not so limited, e.g., a number of INSNs may be associated with a particular system controller channel. For instance, as will be discussed further below with respect to FIG. 4, in one or more embodiments, at least two INSNs are associated with each of a number of particular channels.

Each INSN can include a node controller 332-1, . . . , 332-N communicatively coupled to a number of memory devices 312-1, . . . , 312-N. The memory devices 312-1, . . . , 312-N can include a number of memory cells that can be arranged to provide particular physical or logical configurations, such as a page, block, plane, array, or other group, as previously described.

According to one or more embodiments of the present disclosure, a node controller 332-1, . . . , 332-N can be communicatively coupled to a number of memory devices 312-1, . . . , 312-N by an Open NAND Flash Interface (ONFi) 336-1, . . . , 336-N. ONFi is a particular interface for NAND flash intended to simplifying integration of NAND Flash memory into consumer electronic devices, computing platforms, and industrial systems. ONFi facilitates interoperability between NAND devices, thereby accelerating time to market of NAND-based products. Some features of the ONFi are self identification, command set standardization, and pin out standardization. NAND self identification enables NAND devices to self describe their capabilities to a host, including memory layout, timing support, and enhanced features like interleaved addressing. Standardizing the command set for NAND establishes infrastructure for future evolution of NAND capabilities, while providing flexibility for vendor specific optimizations. Defining a standard pin out promotes board level compatibility with new NAND devices.

According to one or more embodiments of the present disclosure, the system controller 315 can include logic 328 configured for block management, such as block selection, including but not limited to wear leveling, for example. Memory block selection within a memory system 304 can involve determining which physical blocks to write data to and which physical blocks to erase, as well as the order in which the physical blocks are to be written to and erased, for example. The memory cells used in the memory system 304 can be limited to a finite number of write-erase cycles, which can determine the lifetime of the memory system 304. As such, efficient memory block management can increase the life of a memory system 304 since a memory system 304 can experience failure after a number of program and/or erase cycles.

In contrast with previous memory systems, such as memory system 200 shown in FIG. 2, in which the system controller 210 includes separate memory controller circuitry 218-1, . . . , 218-N for each of a number of memory devices 212-1, . . . , 212-N, one or more embodiments of the present disclosure include a memory system controller 315 having centralized wear leveling logic 328 configured to manage wear leveling across the memory devices 312-1, . . . , 312-N, rather than just those memory devices associated with a particular channel. By centralizing wear leveling, wear leveling can be done with respect to, e.g., across, an entire memory system, rather than just across some portion thereof, e.g., a particular channel.

According to one or more embodiments, managing wear leveling can include detecting differences in wear between INSNs, between INSN memory devices associated with a particular INSN, and between INSN memory devices associated with multiple INSNs. In addition to detecting differences in wear, managing wear leveling can include detecting wear above a limit in an individual INSN or INSN memory device. The limit can be a preset fixed limit, a dynamic limit, or a combination thereof.

Wear leveling logic 328 can implement techniques for managing wear leveling. As used herein, managing wear leveling includes bad block management. These techniques can include rotating the cells among the memory devices to which data is written. Wear leveling can also include a technique called garbage collection in which blocks with a number of invalid pages (i.e., pages with data that has been re-written to a different page and/or is no longer needed on the invalid pages) are reclaimed by erasing the block. Garbage collection entails rearranging data among memory devices to account for the dynamic or static nature of the data. Garbage collection included in the wear leveling techniques can be helpful in managing the wear rate of the individual cells of a particular memory device. These wear leveling techniques do not limit the amount of data that is written on memory system 304, and they do not account for the rate of writing data and the time period over which data is written on the device as being a factor that can affect the performance of the drive.

In various embodiments, wear leveling can include dynamic wear leveling to minimize the amount of valid blocks moved to reclaim a block. In dynamic wear leveling, the data blocks with the highest amount of invalid pages can be reclaimed. A page or block of cells in a memory array can be reclaimed by moving valid data from the page or block from a first location to a second page or block location and erasing the first page or block location. Valid data can be data that is desired and should be preserved in memory cells, while invalid data can be data that no longer is desired and can be erased. A threshold for number of total invalid pages in a block can be set to determine if a block will be reclaimed. Particular blocks can be reclaimed by scanning the block table for blocks that have a number of invalid pages above the threshold. A block table can have information detailing the type, location, and status, among other things, for the data in memory cells.

Static wear leveling includes writing static data to blocks that have high erase counts to prolong the life of the block. In static wear leveling, blocks that are storing static data can be exchanged with blocks that have high erase counts so that the blocks with static data, and corresponding lower erase counts, are reclaimed. Blocks that have high erase counts now have static data, therefore reducing the erase rate for that block.

In some embodiments, a number of blocks can be designated as spare blocks to reduce the amount of write amplification associated with writing data among the memory devices. A spare block can be a block in a memory device that can be designated as a block where data can not be written. Write amplification is a process that occurs when writing data to solid state memory devices. When randomly writing data in a memory system, a scan for free space in the system is made. Free space in a memory system can be individual cells, pages, and/or blocks of memory cells that are not programmed, in one or more memory devices. If there is enough free space to write the data, then the data is written to the free space in the memory system. If there is not enough free space in one location, the data in the memory system is rearranged by erasing, moving, and rewriting the data that is already present in the memory system to a new location leaving free space for the new data that is to be written in the memory system. The rearranging of old data in the memory system is called write amplification because the amount of writing the memory system has to do in order to write new data is amplified based upon the amount of free space in the memory system and the size of the new data that is to be written to the memory system. Write amplification can be reduced by increasing the amount of space in a memory system that is designated as free space (i.e., where static data will not be written), thus allowing for less amplification of the amount of data that has to be written because less data will have to be rearranged.

In various embodiments, host and/or user traffic and/or program/erase cycles performed by the memory system 304 can be monitored by the centralized wear leveling logic 328 in the system controller 315, to improve performance of the memory system 304. Host and/or user traffic requests can be made by a host system processor, through the system controller 315, to read data and/or erase/write data in the memory system 304. Program and/or erase cycles can be centrally monitored across all channels, e.g., serial interfaces 324-1, . . . , 324-N, across all INSNs 330-1, . . . , 330-N, and/or across memory devices 312-1, . . . , 312-N of the INSNs comprising memory system 304, to determine the wear rate and life expectancy of the blocks, pages, or other groups of memory cells in the memory system 304. The reader will appreciate that memory cells of a particular block can only be erased and written to a finite number of times.

Host and/or user traffic trends can be centrally monitored and altered by the centralized wear leveling logic 328 to allow the memory system 304 to perform for a desired operational life (e.g., a time period such as hours, days, weeks, years, etc). The centralized wear leveling logic 328 can monitor and limit the number of program and/or erase cycles performed by portions of the memory system 304, to ensure the desired operational life. The centralized wear leveling logic 328 can also monitor the number of program and/or erase cycles performed over a particular time period to determine how to calculate the allowable program and/or erase cycle rate for the drive given the a number of space blocks and the desired operational life of the memory system 304.

In addition, in some embodiments, the number of spare blocks in the memory devices of the memory system 304 can be controlled to ensure operability over a desired operational life for a desired number of write IOPS. The percentage of spare blocks can be optimized for the type of data that is being programmed on the memory system 304. A memory system 304 that has static data (i.e., data that is stored on the drive for long periods of time without being erased and/or rewritten) can have a lower percentage of spare blocks because there is less need to reclaim blocks in the drive due to the static nature of the data having fewer program and/or erase cycles. In a memory system 304 that has dynamic data (i.e., data that is programmed and/or erased more frequently) a higher percentage of spare blocks can be used to reduce the write amplification associated with having to reclaim blocks to perform program and/or erase cycles in a memory device.

According to one or more embodiments of the present disclosure, the system controller 315 can include logic configured for performing physical address to logical address mapping 326, e.g., translation therebetween. For example, the physical to logical address mapping logic 326 can include high speed memory, e.g., DRAM, programmed with a logical-to-physical address map. A logical-to-physical address map can maintain the correlation between a logical block address (LBA) and a physical block address (PBA) of the solid state memory system, or particular INSN memory devices, e.g., 330-1, . . . , 330-N.

Figure 4:
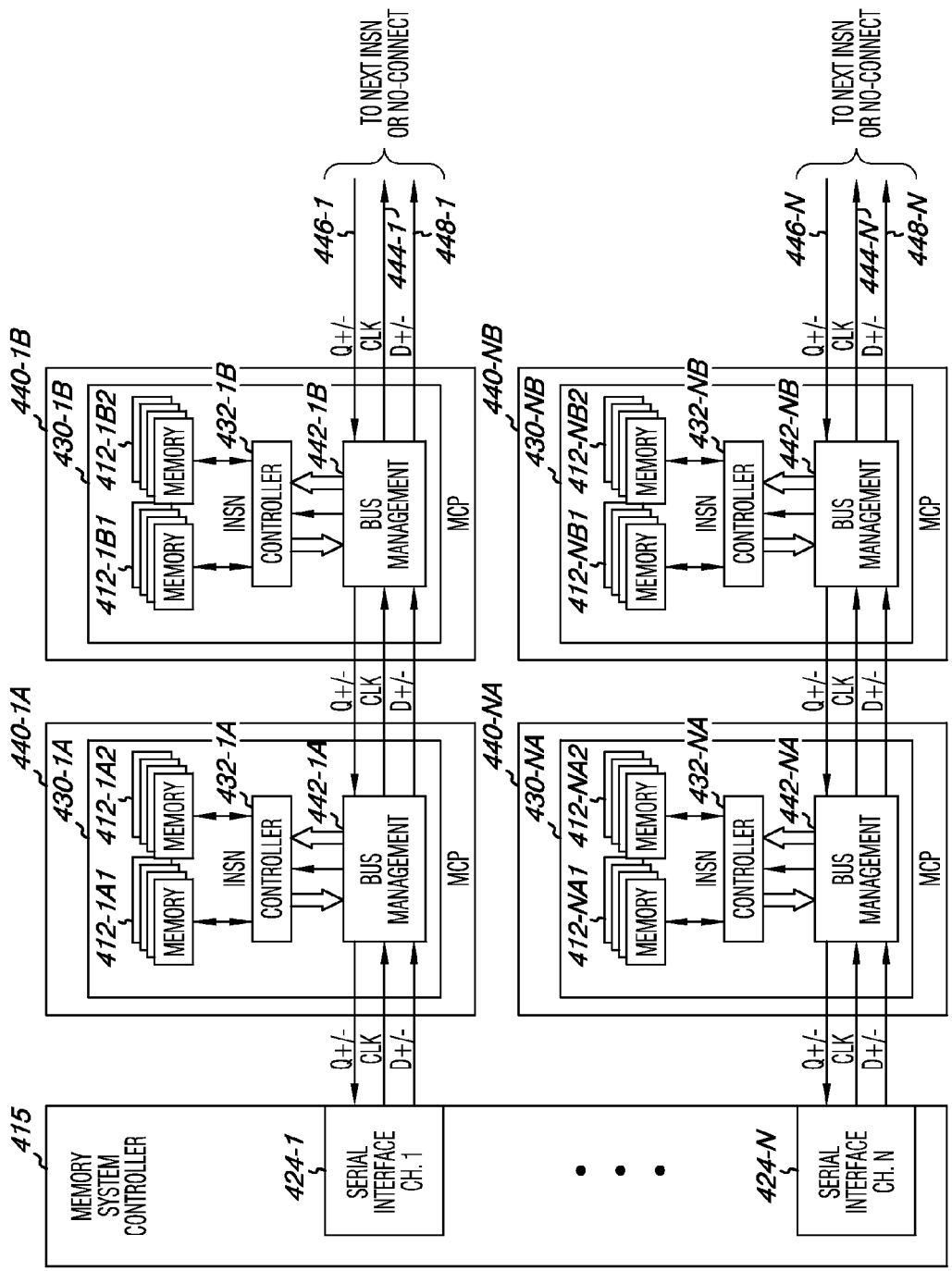
FIG. 4 is a functional block diagram of a memory system including a number of intelligent storage nodes communicatively coupled in series, in accordance with one or more embodiments of the present disclosure.

FIG. 4 is a functional block diagram of a memory system including a number of intelligent NAND storage nodes communicatively coupled in series, in accordance with one or more embodiments of the present disclosure. In one or more embodiments, and as illustrated in FIG. 4, a memory system controller 415 can be communicatively coupled to a number of storage nodes, such as intelligent NAND storage nodes (INSNs), e.g., 430-1A, 430-1B, . . . , 430-NA, 430-NB. The INSNs can be serially coupled, e.g., in a daisy chain arrangement. System controller 415 can include a number of serial interfaces, e.g., 424-1, . . . , 424-N. Other details regarding system controller 415 are omitted from FIG. 4 for clarity; however, system controller 415 may be analogous to system controller 315 in FIG. 3. Each of the number of serial interfaces, e.g., 424-1, . . . , 424-N, are communicatively coupled to a corresponding one or more of a number of storage nodes, e.g., 430-1A, 430-1B, . . . , 430-NA, 430-NB, by a serial bus, e.g., 334-1, . . . , 334-N as shown in FIG. 3.

According to one or more embodiments of the present disclosure, and as shown in FIG. 4, each serial bus can include a clock signal line, e.g., 444-1, ..., 444-N, a first data line (D+/−), e.g., 448-1, ..., 448-N, and a second data line (Q+/−), e.g., 446-1, ..., 446-N. For example, the first data line (D+/−) 448-1, ..., 448-N can be configured for transmitting data in a first direction, e.g., from system controller 415 to the INSNs, and a second data line (Q+/−) 446-1, ..., 446-N can be configured for transmitting data in a second direction, e.g., from the INSNs to the system controller 415, as indicated by the directional arrows shown in FIG. 4. While one particular implementation of a serial bus, having clocked and latched data transfer, is shown in FIG. 4, embodiments of the present disclosure are not limited to the particular implementation shown in FIG. 4, and serial communications may be implemented in other configurations.

In one or more embodiments, each INSN can include a bus management module that corresponds to a particular channel and is communicatively coupled to the serial bus of the respective particular channel. For instance, in the embodiment illustrated in FIG. 4, bus management modules 442-1A and 442-1B corresponding to channel 1 and are communicatively coupled to the serial bus of channel 1, e.g., the respective signal lines 444-1, 446-1, and 448-1 being associated with channel 1. Similarly, bus management modules 442-NA and 442-NB correspond to channel N and are communicatively coupled to the serial bus of channel N, e.g., the respective signal lines 444-N, 446-N, and 448-N being associated with channel N. The bus management module is configured to control a clocked serial bus interconnecting the plurality of INSNs associated with a particular channel. A node controller, e.g., 432-1A, 432-1B, etc. corresponding to channel 1, ..., 432-NA, 432-NB, etc. corresponding to channel N, can be communicatively coupled between the bus management module, e.g., 442-1A, 442-1B, etc. corresponding to channel 1, ..., 442-NA, 442-NB, etc. corresponding to channel N, and a number of memory devices, e.g., 412-1A1, 412-1A2, 412-1B1, 412-1B2, etc. corresponding to channel 1, ..., 412-NA1, 412-NA2, 412-NB1, 412-NB2, etc. corresponding to channel N.

The memory devices, e.g., 412-1A1, 412-1A2, 412-1B1, 412-1B2, etc. corresponding to channel 1, ..., 412-NA1, 412-NA2, 412-NB1, 412-NB2, etc. corresponding to channel N, can include a number of memory cells that can be arranged to provide particular physical or logical configurations, such as a page, block, plane, array, or other group. According to one or more embodiments, the INSNs can each be configured as a multichip package, e.g., 440-1A, 440-1B, ..., 440-NA, 440-NB. In some embodiments, the multichip package can have less than 20 pins for data, control, power, and ground signals. For example, the multichip package of one or more embodiments can have three (or fewer) pins for data and control signals, as is shown in FIG. 4.

As shown in FIG. 4, and according to one or more embodiments of the present disclosure, a plurality of INSNs, e.g., 430-1A, 430-1B, ..., 430-NA, 430-NB, can be communicatively coupled to a particular serial bus, and thus associated with a particular one, e.g., channel, of the number of serial interfaces, e.g., 424-1, ..., 424-N. In some embodiments, a plurality of INSNs can be associated with each channel, e.g., communicatively coupled to the serial bus corresponding to a respective channel.

According to one or more embodiments, the plurality of INSNs, e.g., 430-1A, 430-1B, ..., 430-NA, 430-NB, can be communicatively coupled to a particular serial bus in a daisy chain arrangement with respect to a particular one of the number of serial memory interfaces. Although two INSNs are shown in FIG. 4 being communicatively coupled to the serial bus of each channel, embodiments of the present disclosure are not limited to this quantity of INSNs, and more, or fewer (including none), INSNs can be communicatively coupled to a particular serial bus. Furthermore, embodiments of the present are not limited to having the same quantity of INSNs communicatively coupled to the serial bus of each channel, and the quantity of INSNs on a particular serial bus can be greater, or lesser, than the quantity of INSNs on another particular serial bus.

Figure 5:
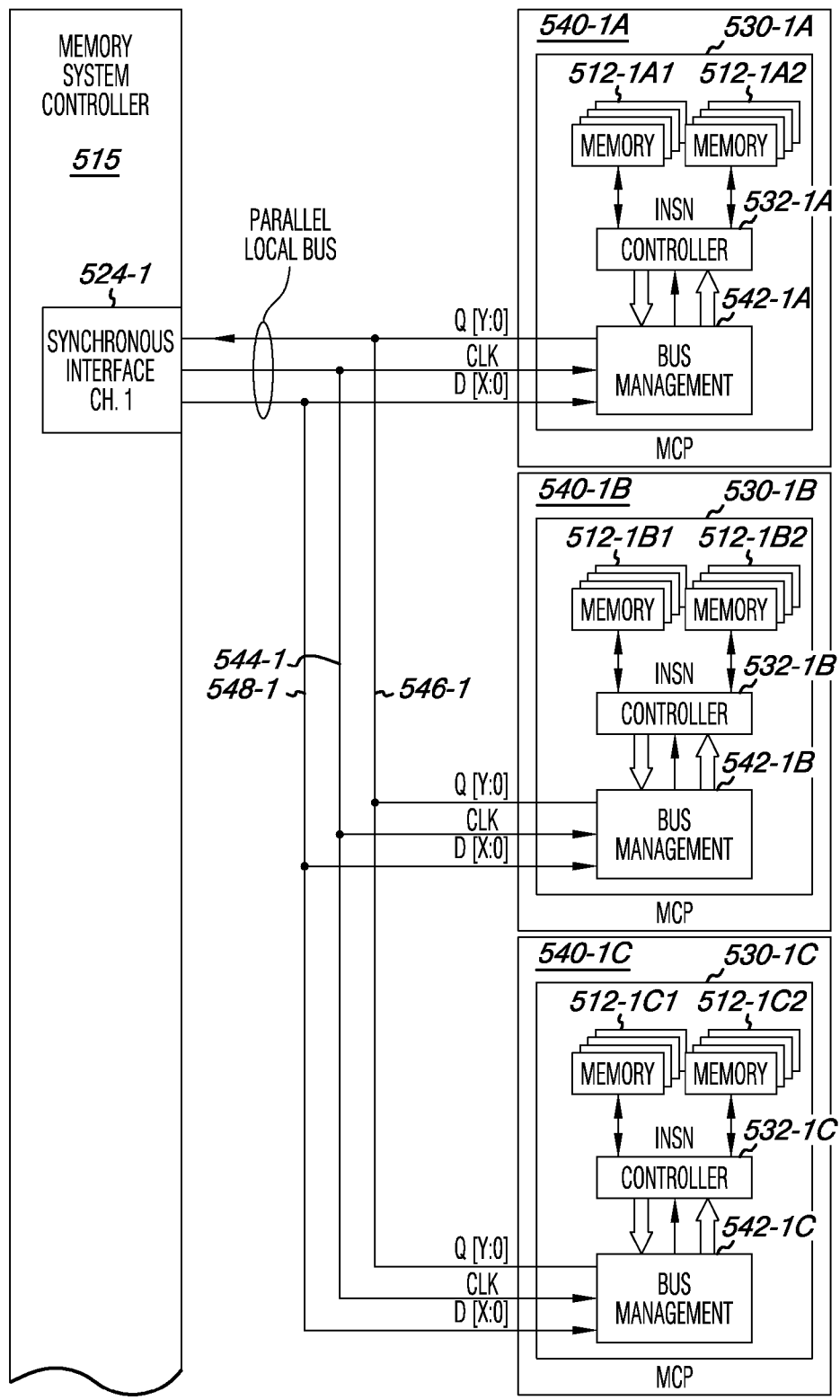
FIG. 5 is a functional block diagram of a memory system including a number of intelligent storage nodes communicatively coupled in parallel, in accordance with one or more embodiments of the present disclosure.

FIG. 5 is a functional block diagram of a memory system including a number of intelligent NAND storage nodes communicatively coupled in parallel, in accordance with one or more embodiments of the present disclosure. In one or more embodiments, and as illustrated in FIG. 5, a memory system controller 515 can be communicatively coupled to a number of storage nodes, such as intelligent NAND storage nodes (INSNs), e.g., 530-1A, 530-1B, 530-1C. System controller 515 can include a number of interfaces, e.g., 524-1, for synchronous communications. Other details regarding system controller 515 are omitted from FIG. 5 for clarity. While only one channel is shown in FIG. 5, embodiments of the present invention are not so limited, and the memory system controller 515 can include additional channels configured for synchronous communications with an additional number of INSNs, and/or additional channels configured for communications with a number of additional INSNs.

Each of the number of interfaces, e.g., 524-1, can be communicatively coupled to a corresponding one or more of a number of storage nodes, e.g., 530-1A, 530-1B, 530-1C, by a synchronous bus, e.g., a parallel local bus. The storage nodes can be communicatively coupled in parallel. For example, a first number of INSNs, e.g., 530-1A, 530-1B, 530-1C, can be communicatively coupled in parallel to a first synchronous interface 524-1, and another number of INSNs (not shown in FIG. 5 for clarity) can be communicatively coupled in parallel to one or more additional channel synchronous interfaces. Embodiments of the present disclosure are not limited to any particular quantity of channels, and may include one or more, e.g., N, channels, each having zero or more INSNs communicatively coupled thereto, e.g., the INSNs corresponding to a particular channel being arranged in parallel.

According to one or more embodiments of the present disclosure, and as shown in FIG. 5, one or more INSNs can be communicatively coupled to a respective synchronous interface through a parallel local bus. The parallel local bus can be a synchronous bus, and can include a clock signal line (CLK), e.g., 544-1, a first data line (Q[Y:0]), e.g., 546-1, and a second data line (D[X:0]), e.g., 548-1. For example, the first data line (Q[Y:0]) 546-1 can be configured for transmitting data in a first direction, e.g., from the INSNs to the system controller 515, and a second data line (D[X:0]) 548-1 can be configured for transmitting data in a second direction, e.g., from system controller 515 to the INSNs, as indicated by the directional arrows shown in FIG. 5. The first data line (Q[Y:0]) may be configured to have a width of Y+1 data bits of information and the second data line (D[X:0]) may be configured to have a width of X+1 data bits of information. While one particular implementation of a synchronous bus, having clocked and latched data transfer, is shown in FIG. 5, embodiments of the present disclosure are not limited to the particular implementation shown in FIG. 5, and parallel communications to the INSNs may be implemented in other configurations, or using other communication protocols.

In one or more embodiments, each INSN can include a bus management module that corresponds to a particular channel and is communicatively coupled to the synchronous bus of the respective particular channel. For instance, in the embodiment illustrated in FIG. 5, bus management modules 542-1A, 542-1B and 542-1C, corresponding to channel 1, are communicatively coupled to the parallel local bus of channel 1, e.g., signal lines 544-1, 546-1, and 548-1. The bus management module is configured to control a clocked synchronous bus interconnecting the plurality of INSNs associated with a particular channel, e.g., parallel local bus. A node controller, e.g., 532-1A, 532-1B, and 532-1C, corresponding to a particular channel 1 can be communicatively coupled between the respective bus management module, e.g., 542-1A, 542-1B, and 542-1C.

The memory devices corresponding to channel 1, e.g., 512-1A1 and 512-1A2 corresponding to INSN 530-1A, 512-1B1 and 512-1B2 corresponding to INSN 530-1B, and 512-1C1 and 512-1C2 corresponding to INSN 530-1C, can include a number of memory cells that can be arranged to provide particular physical or logical configurations, such as a page, block, plane, array, or other group. According to one or more embodiments, the INSNs can each be configured as a multichip package, e.g., 540-1A, 540-1B, 540-1C. In some embodiments, the multichip package can have less than 20 pins for data, control, power, and ground signals.

As shown in FIG. 5, and according to one or more embodiments of the present disclosure, a plurality of INSNs, e.g., 530-1A, 530-1B, 530-1C, may be communicatively coupled to a particular synchronous bus, and thus associated with a particular one, e.g., corresponding to a particular channel, of the number of interfaces, e.g., 524-1. In some embodiments, a plurality of INSNs can be associated with a particular channel, e.g., communicatively coupled to the parallel local bus corresponding to a respective channel. In some embodiments, one INSN can be associated with a particular channel, e.g., communicatively coupled to the parallel local bus corresponding to a respective channel. In some embodiments, no INSN is associated with a particular channel, e.g., communicatively coupled to the parallel local bus corresponding to a respective channel. Furthermore, embodiments of the present are not limited to having the same quantity of INSNs communicatively coupled to a particular channel, and the quantity of INSNs on a particular channel can be greater, or lesser, than the quantity of INSNs on another particular channel.

Figure 6:
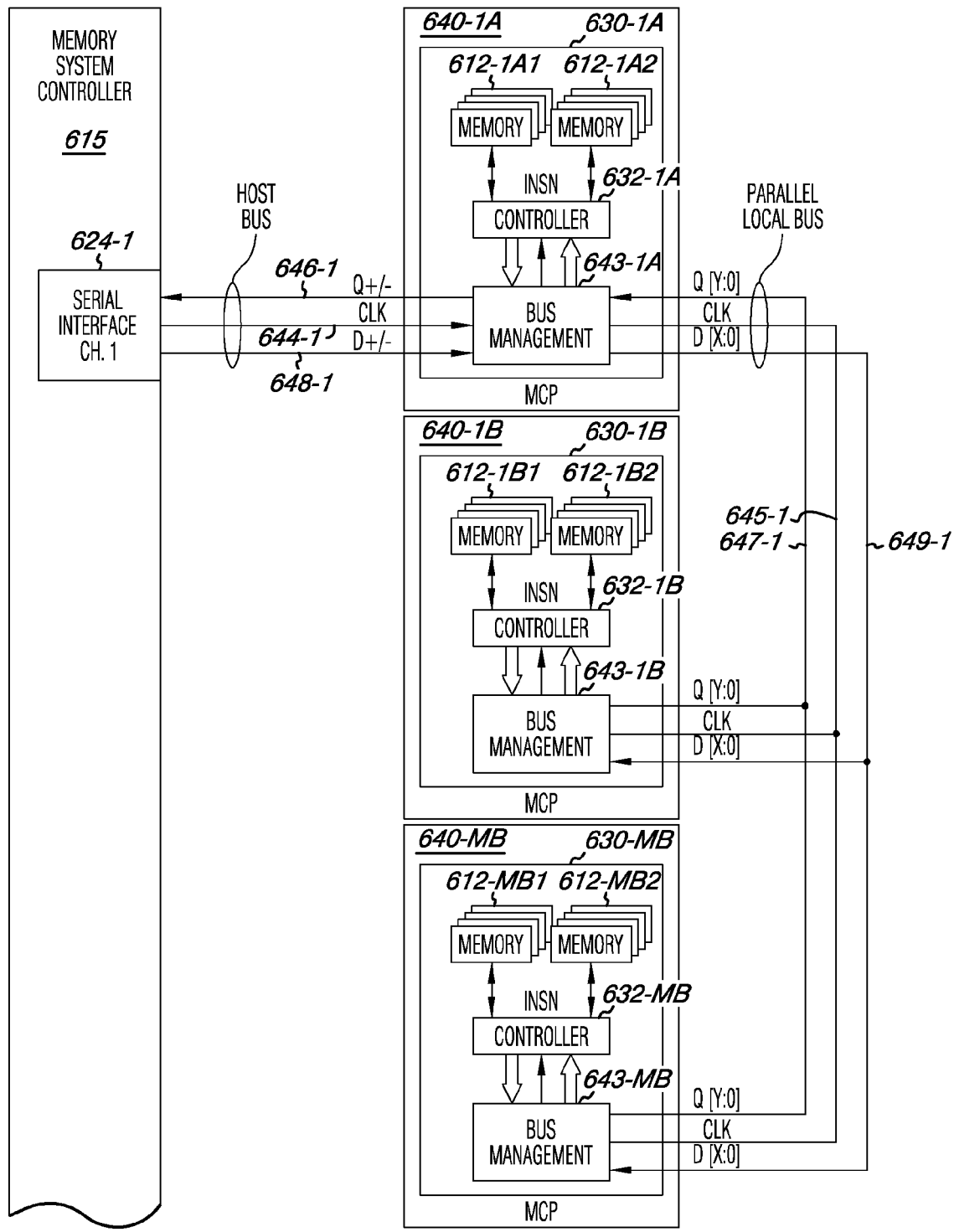
FIG. 6 is a functional block diagram of a memory system including at least one intelligent storage nodes communicatively coupled in series with a number of intelligent storage nodes communicatively coupled in parallel thereto, in accordance with one or more embodiments of the present disclosure.

FIG. 6 is a functional block diagram of a memory system including at least one intelligent NAND storage nodes communicatively coupled in series with a number of intelligent NAND storage nodes communicatively coupled in parallel thereto, in accordance with one or more embodiments of the present disclosure. In one or more embodiments, and as illustrated in FIG. 6, a memory system controller 615 can be communicatively coupled to a number of storage nodes, such as intelligent NAND storage nodes (INSNs), e.g., 630-1A, 630-1B, 630-NB. Embodiments of the present disclosure are not limited to any particular quantity of channels, and may include one or more, e.g., N, channels, each having zero or more INSNs communicatively coupled thereto, e.g., the INSNs corresponding to a particular channel being arranged to include both serial and parallel communication paths thereto.

System controller 615 can include a number of interfaces, e.g., 624-1, configured for serial communications. Other details regarding system controller 615 are omitted from FIG. 6 for clarity. While only one channel is shown in FIG. 6, embodiments of the present invention are not so limited, and the memory system controller 615 can include additional channels configured for serial communications with an additional number of INSNs, e.g., as illustrated in FIG. 4. The system controller 615 can also include additional channels for synchronous parallel communications with a number of additional INSNs, e.g., as illustrated in FIG. 5, and/or can include additional channels configured for serial-parallel communications with an additional number of INSNs, e.g., as illustrated in FIG. 6.

FIG. 6 illustrates that a number of interfaces, e.g., 624-1, can be communicatively coupled to a corresponding one or more of a number of storage nodes, e.g., INSN 630-1A, by a serial bus. Although FIG. 6 shows one INSN, e.g., 630-1A, communicatively coupled in series to interface 624-1, embodiments of the present disclosure are not so limited, and may include more, or fewer, serially-coupled INSNs. Zero to many additional INSNs, e.g., 630-1B, . . . , 630-MB, can be communicatively coupled in parallel to some or all of the one or more serially-connected INSNs, e.g., 630-1A. For example as shown in FIG. 6, a first number of INSNs, e.g., 630-1B, . . . , 630-MB, can be communicatively coupled in parallel to INSN, e.g., 630-1A.

According to one or more embodiments of the present disclosure, and as shown in FIG. 6, one or more INSNs, e.g., 630-1A, can be communicatively coupled to a respective serial interface, e.g., 624-1, through a host bus. The host bus can be a serial bus, and can include a clock signal line (CLK), e.g., 644-1, a first data line (Q+/−), e.g., 646-1, and a second data line (D+/−), e.g., 648-1. For example, the first data line (Q+/−), e.g., 646-1 can be configured for transmitting data in a first direction, e.g., from the serially-coupled INSN 630-1A to the system controller 615, and a second data line (D+/−) 648-1 can be configured for transmitting data in a second direction, e.g., from system controller 615 to the serially-coupled INSNs, e.g., 630-1A, as indicated by the directional arrows shown in FIG. 6. While one particular implementation of a serial bus, having clocked and latched data transfer, is shown in FIG. 6, embodiments of the present disclosure are not limited to the particular implementation shown in FIG. 6, and serial communications to the serially-coupled INSNs, e.g., 630-1A, can be implemented in other configurations, or using other communication protocols.

According to one or more embodiments of the present disclosure, and as shown in FIG. 6, the one or more serially-coupled INSNs, e.g., 630-1A, corresponding to a particular serial interface can also be communicatively coupled through a parallel local bus to an additional quantity of INSNs, e.g., 630-1B, . . . , 630-MB. The additional quantity of INSNs, e.g., 630-1B, . . . , 630-MB, can be communicatively coupled in parallel to the parallel local bus.

The parallel local bus can be a synchronous bus, and can include a clock signal line (CLK), e.g., 645-1, a first data line (Q[Y:0]), e.g., 647-1, and a second data line (D[X:0]), e.g., 649-1. For example, the first data line (Q[Y:0]) 647-1 can be configured for transmitting data in a direction to a serially-coupled INSN, e.g., 630-1A, and a second data line (D[X:0]) 649-1 can be configured for transmitting data from the serially-coupled INSN, e.g., 630-1A, as indicated by the directional arrows shown in FIG. 6. While one particular implementation of a parallel local bus, having synchronous clocked and latched data transfer, is shown in FIG. 6, embodiments of the present disclosure are not limited to the particular implementation shown in FIG. 6, and parallel local bus communications between the serially-coupled INSN and one or more INSNs communicatively coupled in parallel thereto may be implemented in other configurations, or using other communication protocols.

In one or more embodiments, an INSN can include a bus management module, e.g., 643-1A, 643-1B, . . . , 643-MB. For instance, in the embodiment illustrated in FIG. 6, bus management module 643-1A is communicatively coupled to the serial host bus of channel 1, e.g., signal lines 644-1, 646-1, and 648-1, and the synchronous parallel local bus associated with channel 1, e.g., signal lines 645-1, 647-1, and 649-1. Bus management modules 643-1B, . . . , 643-MB are communicatively coupled to the parallel local bus associated with channel 1, e.g., signal lines 645-1, 647-1, and 649-1. The bus management module can be configured to control a clocked serial host bus and/or a clocked synchronous parallel local bus connected thereto.

A media controller, e.g., 632-1A, 632-1B, . . . , 632-MB, can be communicatively coupled between a respective bus management module, e.g., 643-1A, 643-1B, . . . , 643-MB, and a respective number of memory devices, e.g., 612-1A1, 612-1A2, 612-1B1, 612-1B2, . . . , 612-MB1, 612-MB2, corresponding to channel 1.

The memory devices, e.g., 612-1A1, 612-1A2, 612-1B1, 612-1B2, . . . , 612-MB1, 612-MB2, corresponding to channel 1 can include a number of memory cells that can be arranged to provide particular physical or logical configurations, such as a page, block, plane, array, or other group. According to one or more embodiments, the INSNs are each configured as a multichip package, e.g., 640-1A, 640-1B, . . . , 640-MB. In some embodiments, the multichip package can have less than 20 pins for data, control, power, and ground signals. For example, the multichip package of one or more embodiments can have three (or fewer) pins for data and control signals for a host bus and additional pins for the parallel local bus, as is shown in FIG. 6.

Although a number of INSNs, e.g., 630-1B, . . . , 630-MB, are shown in FIG. 6 being communicatively coupled in parallel to a serially-coupled INSN, e.g., 630-1A, embodiments of the present disclosure are not limited to these quantities of serially-coupled and parallel-coupled INSNs respectively. More, or fewer, INSNs can be communicatively coupled in parallel corresponding to a particular serially-coupled INSN, e.g., 630-1A. Furthermore, embodiments of the present are not limited to having the same quantity of serially-coupled INSNs and/or parallel-coupled INSNs communicatively coupled to each channel, and the quantity of serially-coupled INSNs and/or parallel-coupled INSNs on a particular channel can be greater, or lesser, than the respective quantity of serially-coupled INSNs and/or parallel-coupled INSNs on another particular channel.

Figure 7:
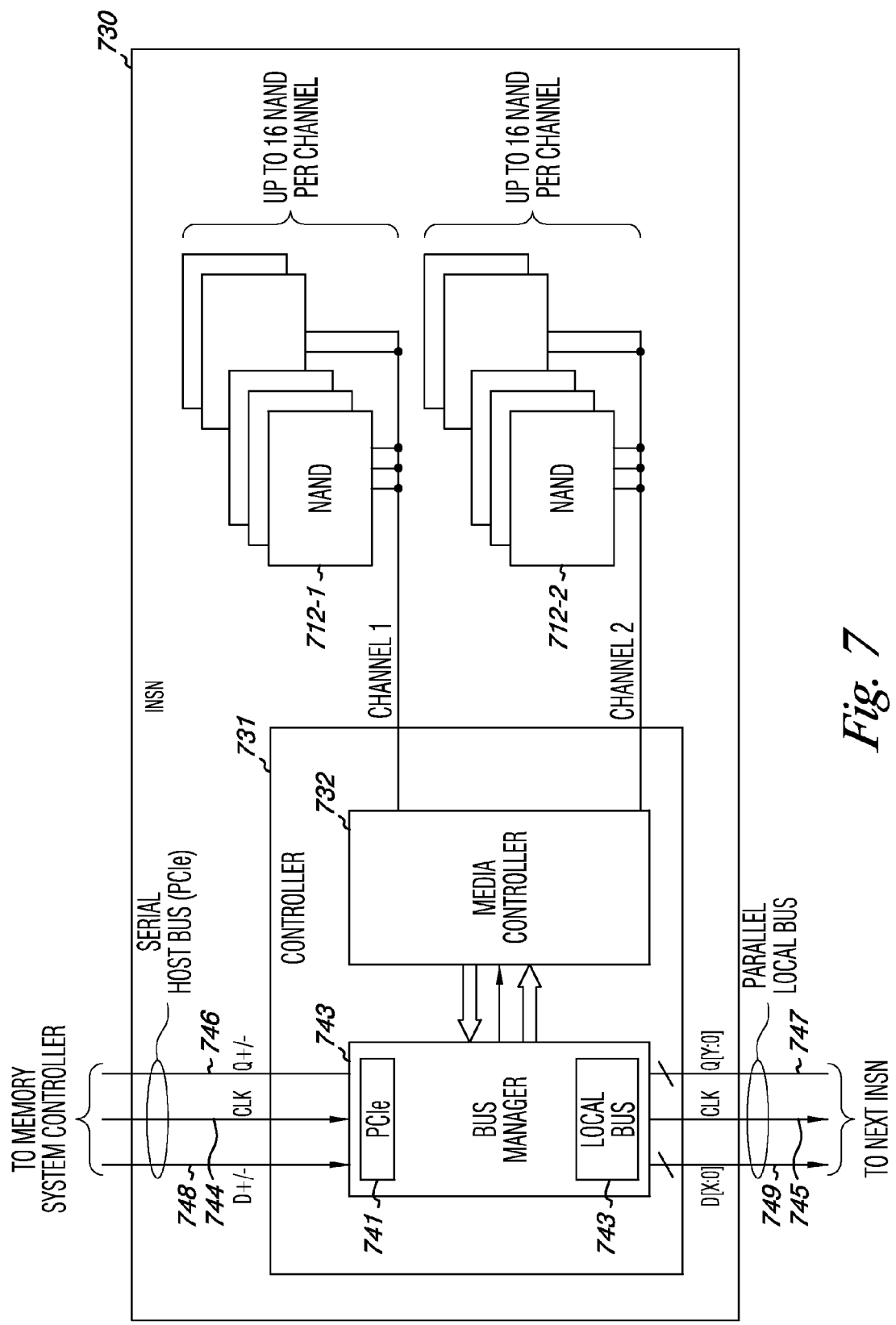
FIG. 7 is a functional block diagram of an intelligent storage node, in accordance with one or more embodiments of the present disclosure.

FIG. 7 is a functional block diagram of an intelligent NAND storage node (INSN), in accordance with one or more embodiments of the present disclosure. INSN 730 may be analogous to the INSNs shown in FIG. 6, e.g., 630-1A, 630-1B, 630-1C. INSN 730 can include a control circuitry 731, e.g., a controller, which can include a bus manager 743 and a media controller 732. Media controller 732 may be analogous to the controllers shown within the INSNs in FIG. 6, e.g., 632-1A, 632-1B, 632-1C.

Bus manager 743 can include a PCIe portion 741 to interface with the host bus, e.g., a clock signal line (CLK) 744 (which may be analogous to clock signal line 644-1 shown in FIG. 6), a first data line (Q+/−) 746 (which may be analogous to first data line 646-1 shown in FIG. 6), and a second data line (D+/−) 748 (which may be analogous to second data line 648-1 shown in FIG. 6). The bus manager 743 also can include and a local bus portion 743 to interface with the local bus, e.g., a clock signal line (CLK) 745, a first data line (Q[X:0]) 747, and a second data line (D[X:0]) 749. As the reader will understand from FIG. 7, the first data line (Q) may be configured to have a width of Y+1 data bits of information and the second data line (D) may be configured to have a width of X+1 data bits of information.

According to one or more embodiments, one or more channels of memory may be communicatively coupled to the media controller 732, each channel including up to 16 NAND per channel, e.g., 712-1, 712-2. Other types, quantities, or arrangements of memory devices are contemplated by embodiments of the present disclosure, and the number of channels may be more, or fewer, than the two channels illustrated in FIG. 7.

Conclusion

The present disclosure includes methods and devices for a memory system controller. In one or more embodiments, a memory system controller includes a host interface communicatively coupled to a system controller. The system controller has a number of memory interfaces, and is configured for controlling a plurality of intelligent storage nodes communicatively coupled to the number of memory interfaces. The system controller includes logic configured to map between physical and logical memory addresses, and logic configured to manage wear level across the plurality of intelligent storage nodes.

In the detailed description of the present disclosure, reference is made to the accompanying drawings that form a part hereof, and in which is shown by way of illustration how one or more embodiments of the present disclosure may be practiced. These embodiments are described in sufficient detail to enable those of ordinary skill in the art to practice the embodiments of this disclosure, and it is to be understood that other embodiments may be utilized and that process, electrical or structural changes may be made without departing from the extent of the present disclosure.

As used herein, the designators "N," "M," "X," and "Y," particularly with respect to reference numerals in the drawings, indicate that a number of the particular feature so designated can be included with one or more embodiments of the present disclosure. As will be appreciated, elements shown in the various embodiments herein can be added, exchanged, or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

It will be understood that when a first element is referred to as being "connected to" or "coupled with" another element, the first element is physically attached to the other of the two elements is intended. In contrast, when elements are referred to as being "communicatively coupled," the elements are in communication with one another.

It will be understood that when an element is referred to as being "on," "connected to" or "coupled with" another element, it can be directly on, connected, or coupled with the other element or layer or intervening elements or layers may be present. In contrast, when an element is referred to as being "directly on," "directly connected to" or "directly coupled with" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and sections, these elements, components, regions, wiring lines, layers, and sections should not be limited by these terms. These terms are only used to distinguish one element, component, region, wiring line, layer, or section from another region, layer, or section. Thus, a first element, component, region, wiring line, layer or section discussed below could be termed a second element, component, region, wiring line, layer, or section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures rather than an absolute orientation in space. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and "comprising," when used in this specification, specify the presence of stated features, integers, steps, operations, elements, or components, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and should not be interpreted in an idealized or overly formal sense unless expressly so defined herein.

Embodiments of the present disclosure are described herein with reference to functional block illustrations that are schematic illustrations of idealized embodiments of the present disclosure. As such, variations from the shapes of the illustrations as a result, for example, of manufacturing techniques and tolerances, are to be expected. Thus, embodiments of the present disclosure should not be construed as limited to the particular shapes of regions illustrated herein but are to include deviations in shapes that result, for example, from manufacturing. For example, a region illustrated or described as flat may, typically, have rough or nonlinear features. Moreover, sharp angles that are illustrated may be rounded. Thus, the regions illustrated in the figures are schematic in nature and their shapes and relative sizes, thicknesses, and so forth, are not intended to illustrate the precise shape/size/thickness of a region and are not intended to limit the scope of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description.

The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system controller and host interface (SCHI), comprising:
   a host interface; and
   a system controller communicatively coupled to the host interface, and having a number of memory interfaces,
   wherein the system controller is configured for controlling a plurality of intelligent NAND storage nodes (INSNs) communicatively coupled to the number of memory interfaces, each of the plurality of INSNs including a node controller communicatively coupled to a number of memory devices by an Open NAND Flash Interface, the system controller including logic configured to map between physical and logical memory addresses, and logic configured to centrally manage wear level across the entire plurality of INSNs communicatively coupled to all of the number of memory interfaces of the system controller collectively as a single memory system for wear leveling, and
   wherein centrally managing wear level includes detecting differences in wear between INSNs, between the number of memory devices associated with a particular INSN, and between memory devices associated with multiple INSNs.

2. The SCHI of claim 1, wherein the memory interfaces are synchronous memory interfaces.

3. The SCHI of claim 2, wherein a first portion of the INSNs are communicatively coupled in parallel to one of the number of synchronous memory interfaces.

4. The SCHI of claim 3, wherein a second portion of the INSNs are communicatively coupled in parallel to a different one of the number of synchronous memory interfaces.

5. The SCHI of claim 1, wherein the memory interfaces are serial memory interfaces.

6. The SCHI of claim 5, wherein the system controller is configured to generate physical page memory access requests to the number of memory interfaces that do not include logical block information.

7. The SCHI of claim 5, wherein each of the number of serial memory interfaces are configured to communicate with at least two INSNs communicatively coupled thereto.

8. The SCHI of claim 5, wherein the system controller includes logic configured to manage wear level across all of the INSNs.

9. The SCHI of claim 8, wherein the logic configured to manage wear level across the number of INSNs includes logic to manage wear leveling across the number of memory devices of a particular INSN.

10. The SCHI of claim 8, wherein the logic configured to manage wear level across the number of INSNs includes logic configured to manage wear leveling across the number of memory devices of a plurality of INSNs.

11. The SCHI of claim 10, wherein the logic configured to manage wear level across the number of INSNs includes logic configured to manage wear leveling across all memory devices of all INSNs.

12. A memory system, comprising:
    a system controller and host interface (SCHI), including:
        a host interface, and
        a memory system controller communicatively coupled to the host interface, and having at least two serial memory interfaces; and
    a plurality of storage nodes communicatively coupled to the at least two serial memory interfaces,
    wherein the memory system controller is configured for controlling the plurality of storage nodes including providing centralized physical to logical address translation for the plurality of storage nodes, and centrally managing wear leveling across the entire plurality of storage nodes communicatively coupled to all of the at least two memory interfaces of the memory system controller collectively as a single memory system for wear leveling, each of the plurality of storage nodes including a node controller communicatively coupled to a number of memory devices by an Open NAND Flash Interface, and
    wherein centrally managing wear level includes detecting differences in wear between storage nodes, between the number of memory devices associated with a particular storage node, and between memory devices associated with multiple storage nodes.

13. The memory system of claim 12, wherein the plurality of storage nodes are intelligent NAND storage nodes (INSNs).

14. The memory system of claim 12, wherein the plurality of storage nodes include a number of memory devices.

15. The memory system of claim 14, wherein the plurality of storage nodes are solid state drives.

16. The memory system of claim 14, wherein the plurality of storage nodes each include a node memory controller communicatively coupled to a number of memory devices.

17. The memory system of claim 16, wherein the number of memory devices are NAND flash memory devices.

18. The memory system of claim 17, wherein the plurality of storage nodes are each configured in a multichip package.

19. The memory system of claim 18, wherein the multichip package has less than 20 pins.

20. The memory system of claim 19, wherein the multichip package has no more than three pins for data and control signals.

21. A memory system, comprising:
    a plurality of intelligent NAND storage nodes (INSNs), each of the plurality of INSNs including a node controller communicatively coupled to a number of memory devices by an Open NAND Flash Interface; and
    a memory system controller communicatively coupled to a first portion of the plurality of INSNs through a first serial interface, and communicatively coupled to a second portion of the plurality of INSNs through a second serial interface,
        wherein the memory system controller is configured to map between logical addresses utilized by a host system and physical addresses utilized by the plurality of INSNs, and the memory system controller is configured to centrally manage wear leveling across the entire plurality of INSNs communicatively coupled to the memory system controller collectively as a single memory system for wear leveling, and
        wherein centrally managing wear level includes detecting differences in wear between INSNs, between the number of memory devices associated with a particular INSN, and between memory devices associated with multiple INSNs.

22. The memory system of claim 21, wherein the first portion of the plurality of INSNs includes multiple INSNs.

23. The memory system of claim 22, wherein the second portion of the plurality of INSNs includes multiple INSNs.

24. The memory system of claim 22, wherein the first and second serial interfaces are a serial communication bus, and the first portion of the plurality of INSNs are arranged in a daisy chain to the first serial communication bus, and the second portion of the plurality of INSNs are arranged in a daisy chain to the second serial communication bus.

25. The memory system of claim 24, wherein each of the INSNs include a bus management module.

26. The memory system of claim 25, wherein each bus management module is communicatively coupled to the node memory controller, and configured to control a serial communication bus for transmitting data to the memory system controller.

27. The memory system of claim 25, wherein the plurality of INSNs each include a number of NAND flash memory devices, and a node controller communicatively coupled between the NAND flash memory devices thereon and the node controller.

28. The memory system of claim 27, wherein each node controller is configured to control NAND flash memory device access and manage NAND flash memory device defects.

29. The memory system of claim 27, wherein each node controller is configured to detect and correct errors in data stored in the NAND flash memory devices.

30. A method of operating a memory system, comprising:
    establishing communications between a plurality of storage nodes and a memory system controller using a number of serial communication interfaces of the memory system controller, each of the plurality of storage nodes having a node controller communicatively coupled between a particular serial communication interface and a number of memory devices, each of the plurality of storage nodes being an intelligent NAND storage nodes (INSN) including a node controller communicatively coupled to a number of memory devices by an Open NAND Flash Interface;
    centrally managing wear leveling among the entire plurality of storage nodes having a node controller communicatively coupled to any of the serial communication interfaces of the memory system controller at the memory system controller collectively as a single memory system for wear leveling; and
    translating between logical addresses and physical addresses for the plurality of storage nodes at the memory system controller,
    wherein centrally managing wear level includes detecting differences in wear between INSNs, between the number of memory devices associated with a particular INSN, and between memory devices associated with multiple INSNs.

31. The method of claim 30, including managing wear leveling among the number of memory devices of a particular storage node at the memory system controller.

32. The method of claim 31, including managing error correction among the number of memory devices of a particular storage node at the node controller associated with the particular storage node.

33. The method of claim 32, including managing wear leveling among the number of memory devices of multiple storage nodes at the memory system controller.

34. The method of claim 33, wherein managing wear leveling among the number of memory devices of multiple storage nodes includes detecting differences in wear between number of memory devices.

35. The method of claim 33, wherein managing wear leveling among the number of memory devices of multiple storage nodes includes detecting wear above a limit in an individual memory device.

36. The method of claim 35, wherein the limit is a preset fixed limit.

37. The method of claim 35, wherein the limit is a dynamic limit.

38. A method for operating a memory system, comprising:
receiving a write command and associated data corresponding to a range of logical addresses from a host system;
determining at a memory system controller, based on centrally managed wear leveling among a number of storage nodes communicatively coupled to the system controller, a particular storage node of the number of storage nodes in which to store the associated data;
mapping the range of logical addresses to physical addresses of the particular storage node; and
transmitting the data serially through a daisy chain of storage nodes to the particular storage node
wherein each of the plurality of storage nodes is an intelligent NAND storage nodes (INSN) including a node controller communicatively coupled to a number of memory devices by an Open NAND Flash Interface, the entire number of storage nodes communicatively coupled to the system controller collectively is a single memory system for wear leveling, and
wherein centrally managed wear leveling includes detecting differences in wear between INSNs, between the number of memory devices associated with a particular INSN, and between memory devices associated with multiple INSNs.

39. The method of claim 38, wherein the method includes communicating physical page access requests by the memory system controller to the INSNs without referencing logical blocks.

40. The method of claim 39, including translating disk drive protocols into raw NAND commands on the memory system controller before transmitting the data serially through a daisy chain of storage nodes.

* * * * *